United States Patent
Balasaygun et al.

(10) Patent No.: US 10,757,547 B2
(45) Date of Patent: Aug. 25, 2020

(54) SEQUENCED APPLICATIONS FOR CONTROLLING COMMUNICATION FEATURES

(71) Applicant: Avaya Inc., Santa Clara, CA (US)

(72) Inventors: Mehmet Balasaygun, Freehold, NJ (US); Rajeshwari Edamadaka, Allentown, NJ (US); Adrian Lee, Nepean (CA); Ruby Agarwal, Lewisville, TX (US)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 15/807,322

(22) Filed: Nov. 8, 2017

(65) Prior Publication Data
US 2019/0141491 A1 May 9, 2019

(51) Int. Cl.
| | |
|---|---|
| *H04W 4/20* | (2018.01) |
| *H04L 29/08* | (2006.01) |
| *G06F 9/54* | (2006.01) |
| *H04W 4/50* | (2018.01) |
| *H04W 4/60* | (2018.01) |

(52) U.S. Cl.
CPC ............ *H04W 4/203* (2013.01); *G06F 9/542* (2013.01); *H04L 67/327* (2013.01); *H04W 4/50* (2018.02); *H04W 4/60* (2018.02)

(58) Field of Classification Search
None
See application file for complete search history.

(56) References Cited

U.S. PATENT DOCUMENTS

| | | | |
|---|---|---|---|
| 7,509,304 B1* | 3/2009 | Pather | G06F 17/30867 |
| 9,307,031 B2 | 4/2016 | Santhanam et al. | |
| 10,115,092 B1* | 10/2018 | Bryan | G06Q 20/123 |
| 2006/0248208 A1* | 11/2006 | Walbeck | H04L 29/06 |
| | | | 709/230 |
| 2008/0263212 A1* | 10/2008 | Goix | H04L 29/06027 |
| | | | 709/228 |

(Continued)

OTHER PUBLICATIONS

Rosenberg et al. "SIP: Session Initiation Protocol," Network Working Group, Jun. 2002, RFC 3261, 270 pages.

*Primary Examiner* — Un C Cho
*Assistant Examiner* — Yu-Wen Chang
(74) *Attorney, Agent, or Firm* — Sheridan Ross P.C.

(57) ABSTRACT

A registration is received from an application framework. The registration is for the application framework to be notified of an event managed by a service gateway. The event is based on a communication service provided by the service gateway. The service gateway detects the event. The service gateway sends a notification associated with the event to the application framework. The notification associated with the event comprises information associated with the event. For example, the notification may include a caller's name and address. An object is received from the application framework that is associated with the event. The object associated with the event further comprises extension information that is not used by the communication service/service gateway. A message is sent to a communication endpoint and/or an external application that comprises the object. The extension information is used to provide custom services that are not supported by the communication service/service gateway.

20 Claims, 4 Drawing Sheets

(56) References Cited

U.S. PATENT DOCUMENTS

| | | | |
|---|---|---|---|
| 2009/0225760 A1* | 9/2009 | Foti | H04L 67/02 |
| | | | 370/400 |
| 2009/0245267 A1* | 10/2009 | Igarashi | H04N 21/41407 |
| | | | 370/401 |
| 2012/0317215 A1* | 12/2012 | Brunner | G06Q 10/107 |
| | | | 709/206 |
| 2013/0073393 A1* | 3/2013 | Nasr | H04L 12/66 |
| | | | 705/14.58 |
| 2016/0285957 A1* | 9/2016 | Haserodt | H04L 67/1097 |
| 2018/0019909 A1 | 1/2018 | Tanabe et al. | |
| 2018/0131644 A1* | 5/2018 | Bueker | H04L 51/02 |
| 2018/0167493 A1* | 6/2018 | Klemenz | H04L 67/42 |

\* cited by examiner

SEQUENCED APPLICATIONS FOR CONTROLLING COMMUNICATION FEATURES

FIELD

The disclosure relates generally to communication systems and particularly to providing extensible communication systems.

BACKGROUND

Currently, many systems provide the ability for a communication endpoint (e.g., a personal computer or smartphone) to communicate with a communication system. Based on the operating system of the communication endpoint, different Software Development Kits (SDKs) are used by the communication endpoints to interface with the communication system. For example, a separate SDK is necessary for Apple's iOS® versus a communication endpoint that uses an Android® operating system.

Developers of communication services on these platforms look to provide custom services that work in conjunction with the communication system based on the SDKs. In addition, developers have a need to provide additional features that may not be currently supported by the communication system/SDKs. In order to add custom features, it is often difficult for developers to provide custom services because the developers only have access to services exposed by existing Application Programming Interfaces (APIs) in the SDKs.

SUMMARY

These and other needs are addressed by the various embodiments and configurations of the present disclosure. A registration is received from an application framework. The registration is for the application framework to be notified of an event managed by a service gateway. The event is based on a communication service provided by the service gateway. For example, the event may be a receipt of a voice call from a specific customer. The service gateway detects the event. The service gateway sends a notification associated with the event to the application framework. The notification associated with the event comprises information associated with the event. For example, the notification may include a caller's name and address. An object is received from the application framework that is associated with the event. The object associated with the event further comprises extension information that is not used by the communication service/service gateway. A message is sent to a communication endpoint and/or an external application that comprises the object. The extension information is used by the communication endpoint/external application to provide custom services that are not supported by the communication service/service gateway.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "Session Initiation Protocol" (SIP) as used herein refers to an IETF-defined signaling protocol, widely used for controlling multimedia communication sessions such as voice and video calls over Internet Protocol (IP). The protocol can be used for creating, modifying and terminating two-party (unicast) or multiparty (multicast) sessions consisting of one or several media streams. The modification can involve changing addresses or ports, inviting more participants, and adding or deleting media streams. Other feasible application examples include video conferencing, streaming multimedia distribution, instant messaging, presence information, file transfer and online games. SIP is as described in RFC 3261, available from the Internet Engineering Task Force (IETF) Network Working Group, November 2000; this document and all other SIP RFCs describing SIP are hereby incorporated by reference in their entirety for all that they teach.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor an exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
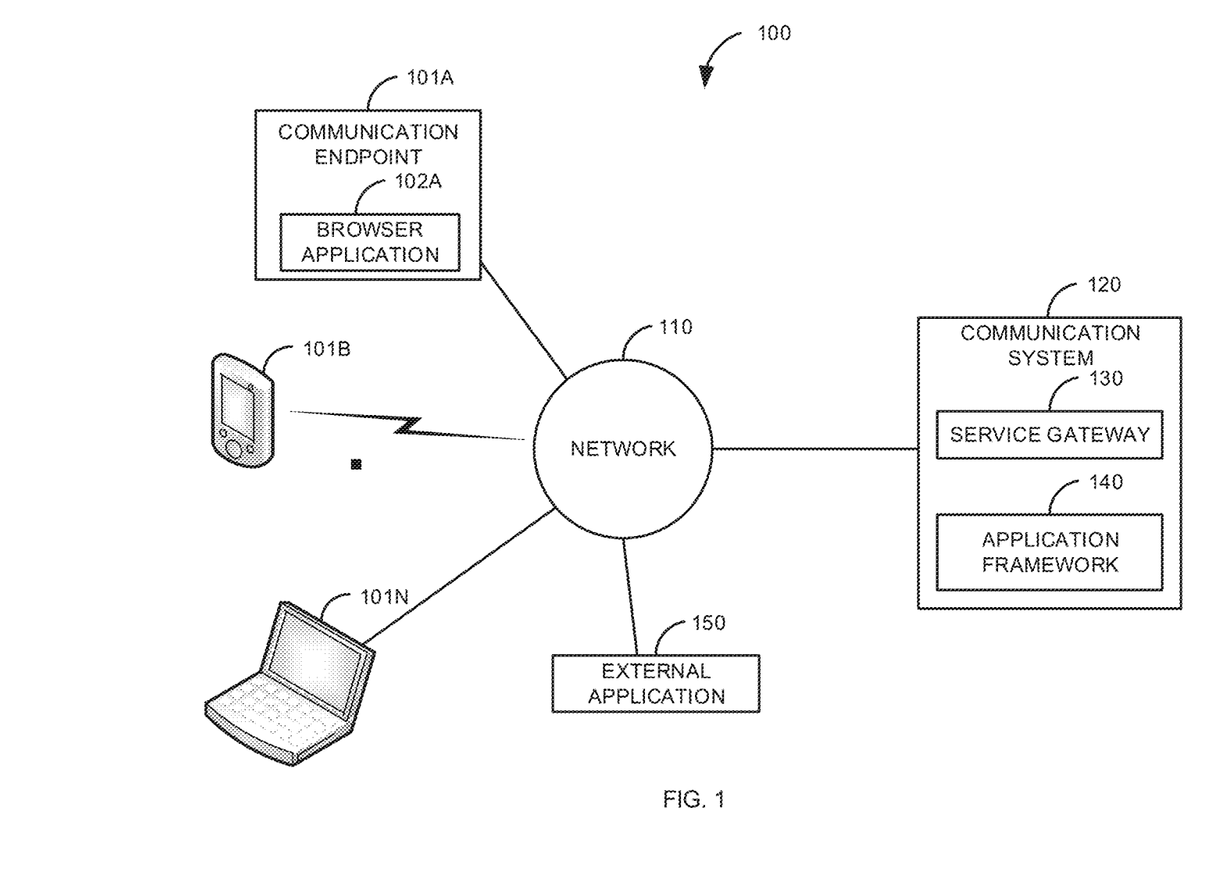
FIG. 1 is a block diagram of a first illustrative system for sequencing a framework application into a communication session.

FIG. 1 is a block diagram of a first illustrative system 100 for sequencing a framework application 141 (discussed in FIG. 2) in a framework application 140 into a communication session. The first illustrative system 100 comprises communication endpoints 101A-101N, a network 110, a communication system 120, and an external application 150.

The communication endpoints 101A-101N can be or may include any communication endpoint device that can communicate on the network 110, such as a Personal Computer (PC), a telephone, a video system, a cellular telephone, a Personal Digital Assistant (PDA), a tablet device, a notebook device, a web server, a media server, a smart phone, an Interactive Voice Response System (IVR), and/or the like. The communication endpoints 101A-101N are devices where a communication sessions ends. The communication endpoints 101A-101N are not network elements that facilitate and/or relay a communication session in the network 110, such as a communication manager or router. As shown in FIG. 1, any number of communication devices 101A-101N may be connected to the network 110.

The communication endpoint 101A further comprises a browser 102A. The browser 102A can be or may include any software browser used by the communication endpoint 101A, such as Google Chrome™, Opera™, Firefox™, Safari™, Internet Explorer™, and/or the like. Although not shown, the communication endpoints 101B-101N may also comprise a browser (i.e., browsers 101B-101N). The browser 102A communicates using various known protocols, such as Web Real-Time Communication (WebRTC) protocol, Hyper Text Transfer Protocol (HTTP), JavaScript Object Notation (JSON), Hyper Text Markup Language (HTML), Java script, and/or the like.

In one embodiment, the communication endpoint 101 may not have a browser 102. For example, the communication endpoint 101 may have an application that communicates with the communication system 120.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), H.323, Integrated Services Digital Network (ISDN), video protocols, WebRTC, HTTP, JSON, HTML, JavaScript, and the like. Thus, the network 110 is an electronic communication network configured to carry messages via packets and/or circuit switched communications.

The communication system 120 can be or may include any hardware coupled with software that can provide communication services, such as a Private Branch Exchange (PBX), a session manager, a communication manager, a proxy server, a switch, and/or the like. The communication system 120 further comprises a service gateway 130 and an application framework 140.

The service gateway 130 can be or may include any hardware coupled with software that can provide communication services for the communication endpoints 101A-101N and/or the external application 150. The service gateway 130 can provide a variety of communication services, such as contact center services, telephony services, presence services, virtual client services, SIP endpoint adapter services, computer telephony integration services, Instant Messaging (IM) services, email services, text messaging services, multi-media services, virtual reality services, video services, call routing services, and/or the like. The service gateway 130 may provide services that allow a first communication endpoint 101/first external application 150 to communicate with a second communication endpoint 101/second external application 150 using different protocols. For example, a first communication endpoint 101 may use SIP and a second communication endpoint 101 may use WebRTC.

The application framework 140 can be or may include any hardware/software that can provide additional services to those provided by the service gateway 130. The application framework 140 allows framework applications 141 to register with the service gateway 130 to be notified of events that occur with communication services provided by the service gateway 130. In FIG. 1, the application framework 140 is shown in the communication system 120. However, in one embodiment, the application framework 140 is on a separate network element, such as on a separate server. In another embodiment, the application framework 140 may be distributed between the communication system 120 and another server on the network 110.

The external application 150 can be or may include any application that runs on a hardware device that can access the service gateway 130. For example, the external application 150 may access the service gateway 130 using the same protocols as the browser 102. Alternatively, the external application 150 may access the service gateway using different protocols. The external application 150 may passively listen to communication sessions to take independent actions. For example, the external application 150 may be a billing application. The billing application does not influence the context/properties of a communication session, but the billing application monitors the con text/properties of the communication session. An external application 150 may add additional properties to the communication session and does not have to be built within the bounds of the application framework 140. In a sense, framework applications 141 running on the application framework 140 and the external application 150 can equally influence and affect the properties of the communication session.

Figure 2:
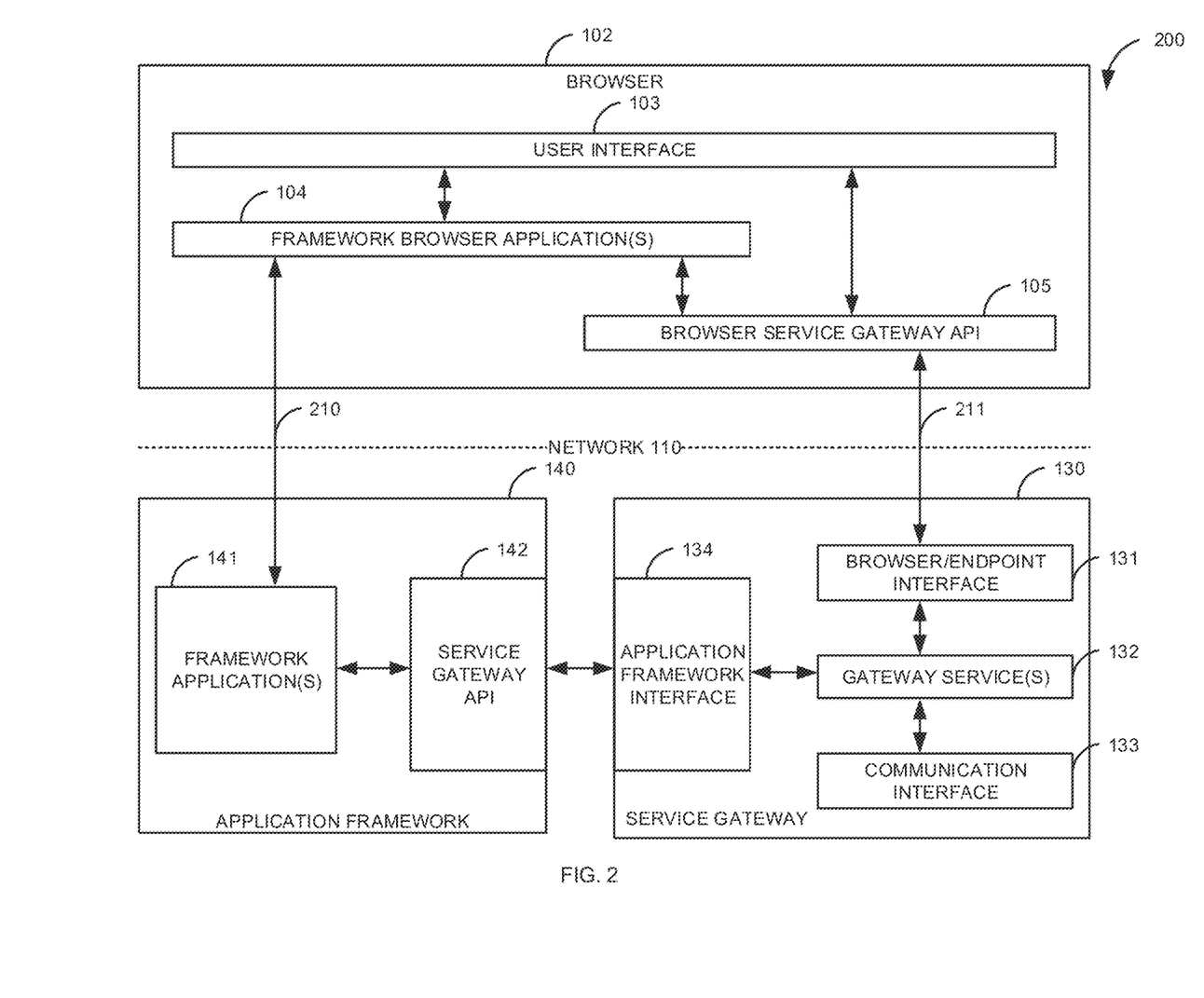
FIG. 2 is a block diagram of a second illustrative system that shows an architecture for sequencing a framework application into a communication session.

FIG. 2 is a block diagram of a second illustrative system 200 that shows an architecture for sequencing a framework application 141 into a communication session. The second illustrative system 200 shows a detailed version of the browser 102, the service gateway 130, and the application framework 140.

In FIG. 2, the browser 102 further comprises a user interface 103, one or more framework browser applications 104, and a browser service gateway API 105. The user interface 103 allows a user to interact with the browser 102 via a display and input devices, such as a mouse, a touchscreen, a voice interface, and/or the like.

The user, via the user interface 103, may gain access to different gateway services 132 by accessing the browser service gateway API 105. In one embodiment, a user may gain access to different gateway services 132 by accessing the framework browser application(s) 104 that in turn access the browser service gateway API 105.

The framework browser application(s) 104 can be or may include any software that can be added to the browser 102 (e.g., a browser plug-in) to provide additional functionality to a communication session and/or to enhance a communication session. The framework browser application(s) 104 may provide additional services, such as billing services, enhanced telephony services, custom contact center services, enhanced routing services, user interface 103 customization services, advanced email services, advanced Instant Messaging (IM) services, enhanced video communication services, enhanced text messaging services, and/or the like.

The framework browser application 104 communicates with one or more framework application(s) 141. The framework browser application 104 may directly communicate, via the network 110, with a framework application 141 as shown by communication path 210. Alternatively, the framework browser application 104 may communicate indirectly with a framework application 141 via communication path 211/network 110 via the browser service gateway API 105.

The browser service gateway Application Programming Interface (API) 105 is a programming interface that allows the user interface 103 and/or the framework browser applications 104 to access the gateway services 132 (e.g., make function calls to the gateway services 132 or receive information from the gateway services 132). The browser service gateway API 105 may have different groups of APIs for each type of gateway service 132. For example, the browser service gateway API 105 may comprise different APIs for media services, telephony services, and presence services.

In FIG. 2, the service gateway 130 comprises a browser/endpoint interface 131, the gateway services 132, a communication system interface 133 and an application framework interface 134. The browser/endpoint interface 131 can be or may include any software that can communicate with the browser 102, such as a web server, and/or the like. The browser/endpoint interface 131 may use the communication interface 133 to send and receive messages from the browser service gateway API 105.

The gateway service(s) 132 can be or may include any communication services that are provided by the service gateway 130. For example, a communication service may be a telephony service, a video service, an IM service, a text messaging service, an email service, a presence service, a contact center service, a client Virtual Private Network (VPN) service, a Computer Telephony Integration (CTI) service, a SIP endpoint adapter service (e.g., one that translates a SIP communication session to WebRTC), and/or the like. The gateway services 132 are accessed from the browser 102 via the browser service gateway API 105/browser/endpoint interface 131.

The communication interface 133 can be or may include any hardware coupled with software that is used for sending/receiving various types of communications, such as voice communications, email communications, video communications, text messaging communications, IM communications, virtual reality communications, and/or the like. The communication interface 133 may also comprise a network interface, such as an Ethernet interface, a wireless interface, a fiber interface, a wired interface, and/or the like. The communication interface 133 may also connect to the network 110 or to a second network 110.

The application framework interface 134 is an interface that provides access to the gateway services 132. The application framework interface 134 allows the framework application(s) 141 to communicate with the gateway services 132. For example, to receive notifications from the gateway services 132.

In FIG. 2, the application framework 140 comprises the framework application(s) 141 and a service gateway API 142. The framework application(s) 141 can be or may include any application that can provide additional communication services and/or enhance existing communications. For example, the framework browser application(s) 141 may be a billing service, an enhanced telephony service, a custom contact center service, an enhanced routing service, a user interface 103 customization service, an advanced email service, an advanced Instant Messaging (IM) service, an enhanced video communication service, an enhanced text messaging service, and/or the like. The framework application(s) 141 work in conjunction with the framework browser application(s) 104 to provide custom communication services.

Figure 3:
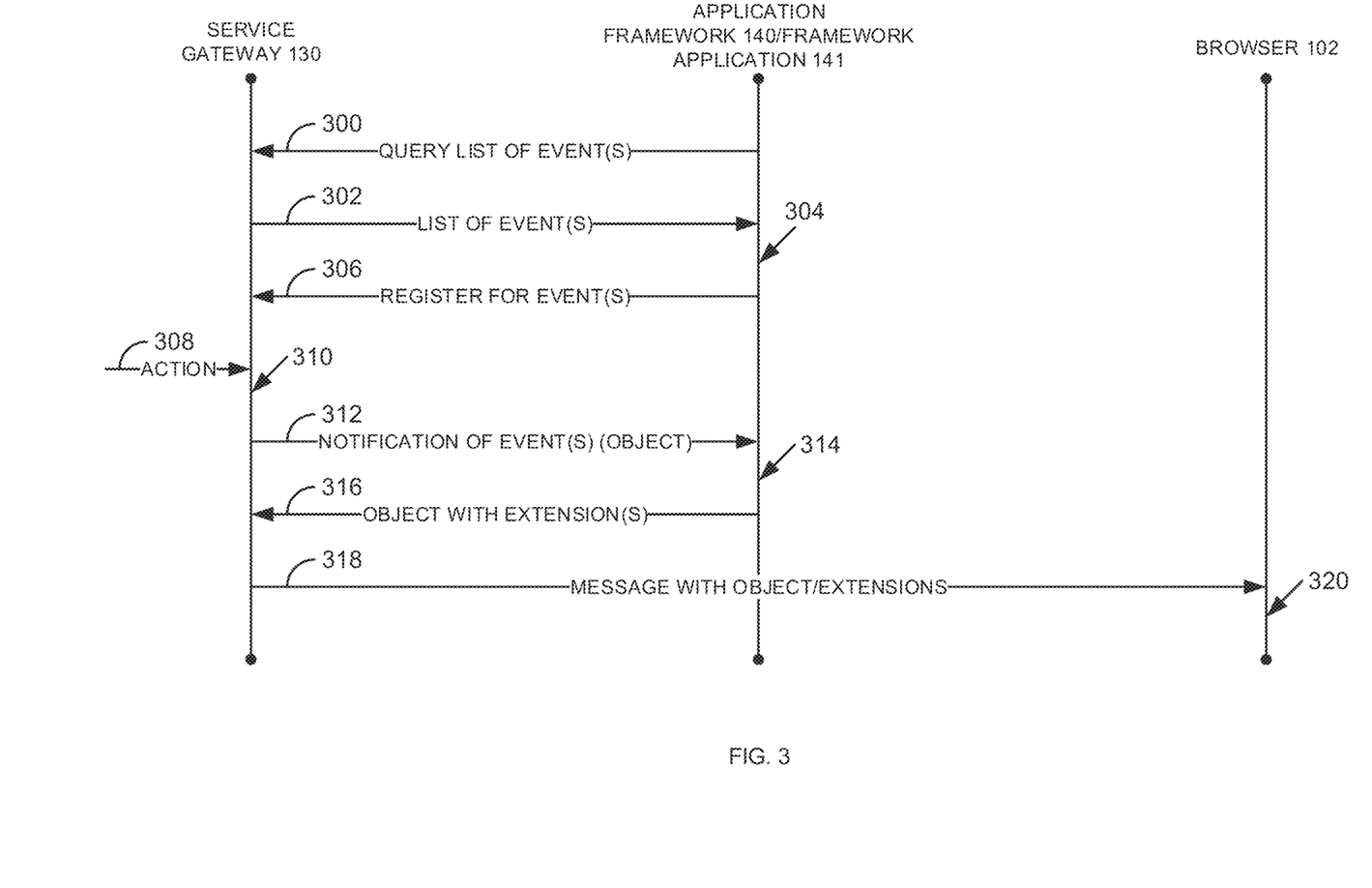
FIG. 3 is a flow diagram of a process for sequencing a framework application based on registering for an event in a communication session.
Figure 4:
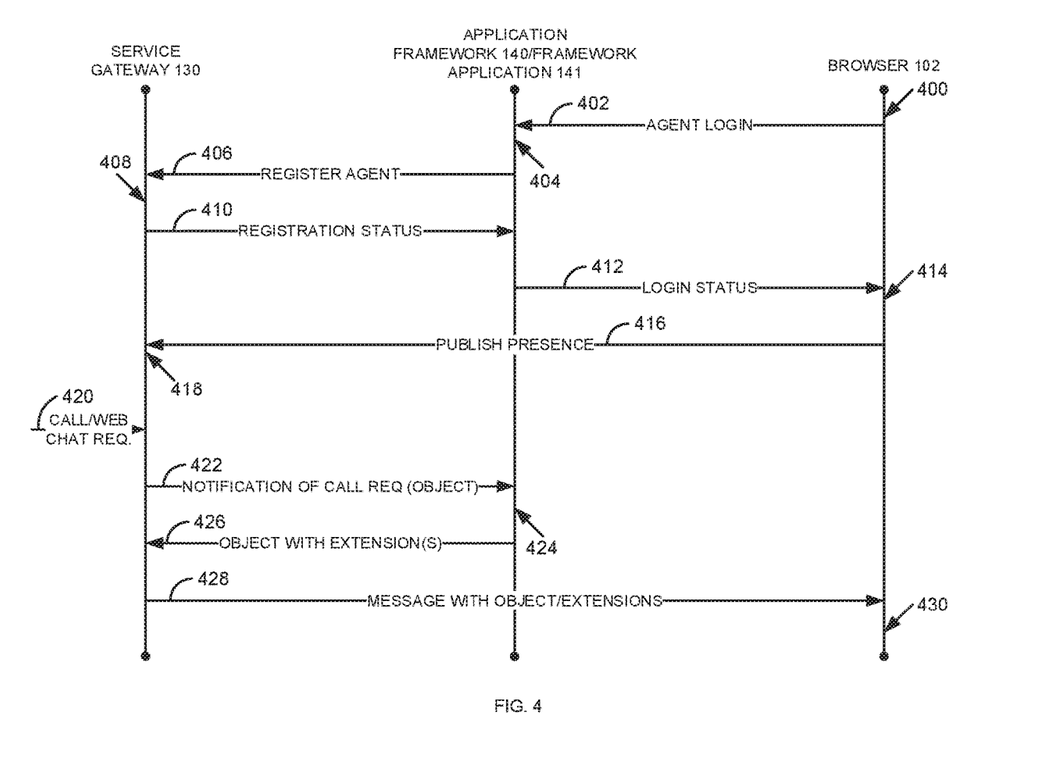
FIG. 4 is a flow diagram of a process for sequencing a framework application into a communication session using multiple gateway services.

FIG. 3 is a flow diagram of a process for sequencing a framework application 141 based on registering for an event in a communication session. Illustratively, communication devices 101A-101N, the browser 102, the user interface 103, the framework browser application(s) 104, the browser service gateway API 105, the communication system 120, the service gateway 130, the browser/endpoint interface 131, the gateway service(s) 132, the communication interface 133, the application framework interface 134, the application framework 140, the framework applications 141, the service gateway API 142 and the external application 150 are stored-program-controlled entities, such as a computer or microprocessor, which performs the method of FIGS. 3-4 and the processes described herein by executing program instructions stored in a computer readable storage medium, such as a memory (i.e., a computer memory, a hard disk, and/or the like). Although the methods described in FIGS. 3-4 are shown in a specific order, one of skill in the art would recognize that the steps in FIGS. 3-4 may be implemented in different orders and/or be implemented in a multi-threaded environment. Moreover, various steps may be omitted or added based on implementation.

The process of FIG. 3 is described generically for a framework application 141/framework browser application 104. However, one of skill in the art would recognize that the processes described in FIG. 3 may be used for a variety of applications that access a variety of gateway services 132.

The process starts in step 300 when a framework application 141, via the service gateway API 142, queries the service gateway 130 for a list for a list of event(s). The queried list of event(s) may be for a specific gateway service 132. For example, the framework application 141 may send the query of step 300 to get all the event(s) for a telephony service, an email service, a presence service, and/or the like. The list of event(s), for example for the telephony service may be for an incoming call, an outgoing call, a call to or from a specific number, a receipt of a voicemail, a selection of an Interactive Voice Response (IVR) menu, when a call is placed in a contact center queue, when a call is put on hold, when a call is dropped, and/or the like. Similarly, the list of event(s) may be different for a different gateway service 132. For example, the list of event(s) for the presence service may include events that indicates when a user logs in, when a user makes a call, when a user sets their presence to available/not available, and/or the like.

The service gateway 130, via the application framework interface 134/gateway service 132 responds, in step 302, with a list of event(s). The framework application 141 receives the list of event(s) in step 302. The framework application 141 determines, in step 304, that it wants to register for one (or more) of the events in the list of event(s). The framework application 141 sends, in step 306, a message, via the service gateway API 142, to register for the event(s). For example, the framework application 141 may register to receive a notification when an email from a specific user is received by an email gateway service 132 in step 306.

In one embodiment, the external application 150 may query the application framework 140 to get a list of events and then register for one or more events in a similar manner as described in steps 300-306.

The external application 150 may also influence the service gateway 130. The external application 150 may provide policies to the service gateway 130 (e.g., a set of agreed upon directives that the service gateway 130 can understand). For example, the directive may be to not allow a call to be placed on hold, not allow a hang-up by a specific user, not allow a transfer to a specific extension, and/or the like. The external application 150 may also provide constraints, such as timer. For example, the external application 150 may send a constraint that a user cannot be put on hold for longer than x seconds or not allow a transfer to a specific extension within or after a time period.

In one embodiment, multiple framework applications 141 may register for multiple events from multiple gateway services 132. The multiple framework application 141 may register based on a priority of the framework applications 141 or on a first come-first-serve basis.

The gateway service 132 that registered the event waits until the event occurs in step 308. For example, the event may be the action of receiving the email from the specific user. In one embodiment, the event may be a SIP based event, such as, receiving a SIP INVITE message to establish a communication session. The service gateway 130 (the specific gateway service 132) determines that the event has occurred in step 310. Once the event occurs, the gateway service 132 sends a notification of the event (or multiple events if they occur at the same time) in step 312 to the framework application 141. In one embodiment, the notification may comprise a JSON object that includes information about the event. For example, for the email event, the JSON object may contain details, such as, date, time, sender's email address, recipient's email address, contents of the email, and/or the like. The JSON object may also include an empty extension information field. The extension information field may be used by the framework application 141 to indirectly pass information (that is not used by the gateway service 132/browser service gateway API 105) to the framework browser application 104.

In one embodiment, instead of a JSON object, another type of object may be used for the extension information. For example, the extension information may be a tag in an Extended Markup Language (XML) object or a message in a header.

The framework application 141, in step 314, adds, to the extension information in the JSON object (or other type of object/header). The added extension information is not used by the gateway service 132/browser service gateway API 105/service gateway 130. Instead, the gateway service 132/ browser service gateway API 105/service gateway 130 just passes along the extension information to the framework browser application 104. The application framework 140 sends the JSON object (or other type of object/header) with the added extension information to the service gateway 130 in step 316.

The service gateway 130 (application framework interface 134/gateway service 132) receives the JSON object with the extension information in step 316. The service gateway 130 (the gateway service 132/browser/endpoint interface 131) sends a message to the browser 102 (the framework browser application 104) that includes the JSON object (or other type of object/header) with the added extension information in step 318. The framework browser application 104 takes the added extension information and performs an action in the browser 102.

To further illustrate the process of FIG. 3, consider the following example for managing a received voice call in a contact center. In this example, the gateway services 132 comprises a SIP endpoint adaptor and a telephony service. The SIP endpoint adaptor is a gateway between a SIP voice call from a first communication endpoint 101B or external application 150 (e.g. a conference bridge) and a second communication endpoint 101A that uses WebRTC in the browser 102A. The framework application 141 is a contact center application for managing voice calls in the contact center. Assume that the contact center application has queried and received the list of events from the telephony service (the gateway application 132) in steps 300 and 302. The contact center application (the framework application 141) has registered to receive a notification from the telephony service (the gateway service 132) when a call is received for the contact center (steps 304 and 306).

An incoming SIP voice call is received from the communication endpoint 101B at the communication system 120 (step 308). The voice call is processed by the SIP endpoint adaptor (a first gateway service 132). The voice call is sent to the telephony service (a second gateway service 132). The telephony service determines that the call is for a registered event (an incoming call for the contact center in step 310). The telephony service sends, via the service gateway 130, a notification with a JSON object in step 312. The JSON object contains information about the voice call. For example, the JSON object may contain the caller's telephone number, name, address, date/time of the call, etc. The JSON object also comprises an extension field that is empty.

The contact center application (framework application 141) receives the notification with the JSON object (step 312) with the empty extension information field. The contact center application (framework application 141) determines that the caller is a gold customer (i.e., a high priority customer that does a lot of business with the contact center). The contact center application has defined a rule that for a gold customer, a contact center agent cannot place the caller on hold in the first 60 seconds of the voice call.

The contact center application (the framework application 141) adds information to the extension information to indicate that for this caller, the contact center agent cannot place caller on hold for the first 60 seconds of the voice call in step 314. The contact center application sends, in step 316, the JSON object with the added extension information to the telephony service (the gateway service 132). The telephony service, via the browser/endpoint interface 131/browser service gateway API 105, sends the JSON object with the added extension information to a browser contact center application (a framework browser application 104). As the voice call is established, the communication session between the communication endpoint 101B/external application 150 (a SIP client) and the browser 102 (a WebRTC client), the browser contact center application takes the caller information and populates the user interface 103 with the caller information. For example, the user interface 103 may be displayed to a contact center agent when the call is received by the contact center agent. When the voice call is established, the user interface 103 displays the caller's name, address, status, and buttons to transfer, place on hold, and drop the call. The browser contact center application (the framework browser application 104), based on the extension information that indicates that this is a gold customer, disables the hold button during the first 60 seconds of the call.

FIG. 4 is a flow diagram of a process for sequencing a framework application 141 into a communication session using multiple gateway services 132. A contact center agent is presented with a login screen by a browser contact center application (framework browser application 104) via the user interface 103. The contact center agent enters his/her login credentials and tries to login in step 400. The browser contact center application sends the agent's login credentials directly (as a separate communication, via communication path 210) to the contact center application (framework application 141) in step 402. For example, the agent's login credentials may be sent using a Representational State Transfer (REST) API. The contact center application (framework application 141), in step 404, validates the agent's login credentials and registers the agent with gateway services 132 that the agent is entitled to use (e.g., web chat/ telephony services). To do this, the contact center application (framework application 141) sends a message to the service gateway 130 (to a gateway service 132 for a contact center) to register the agent (assuming the credentials are valid) in step 406.

The service gateway 130 (e.g., a contact center agent gateway service 132) implements a virtual endpoint service that services the functionality the agent is entitled to use in step 408. A virtual communication endpoint is established with the browser 102 and a SIP endpoint adapter (a gateway service 132). In addition, the virtual endpoint connection allows the contact center agent to perform a web chat (i.e., SIP from the contact center agent to WebRTC for the other party).

The notification of step 406 is also passed to a telephony service (a gateway service 132) in step 408. The telephony service/contact center agent gateway service (gateway service 132) provides the registration status to the contact center application (the framework application 141) in step 410. This allows the agent to receive voice calls. The contact center application sends login status to the browser in step 412 via communication path 210. The user is updated of whether the login was successful.

In step 414, the contact center agent elects to set his/her presence status to indicate that the contact center agent is present. For example, the contact center agent may be available to start receiving voice calls and/or web chats via the user interface 103. The browser service gateway application (a framework browser application 104) sends a message to the browser service API 105 that sends the presence status/request to a presence gateway service 132 in step 416. The presence gateway service 132 sends the presence status to the virtual endpoint service/SIP endpoint adapter (gateway services 132) to allow the contact center agent to establish a web chat session with a SIP communication endpoint 101 in step 418. In one embodiment, the presence status may also be sent to the telephony service in step 418 to allow the contact center agent to start receiving voice calls coming into the contact center.

A call or web chat request is received in step 420. In a similar manner to steps 300/306, the contact center application (framework application 141) has registered to be notified when a voice call or web chat request is received. The gateway services 132 (via telephony/agent gateway service/presence service) sends a notification that a voice call or web chat has been received in step 422. The notification includes a JSON object with empty extension information. The contact center application (framework application 141) adds additional information to the JSON object that can be used by the browser contact center application (framework browser application 104) in step 424. The framework application 141 sends the JSON object with the added extension information in step 426 to the service gateway 130 (the contact center application). The contact center application (a gateway service 132) sends a message that includes the JSON object with the added extension information, via the browser/endpoint interface 131/browser service gateway API 105, to the browser contact center application (framework browser application 104) in step 428. The browser contact center application uses the added extension information to change the user interface 103 in step 430.

The Above examples are described where the contact center agent is involved in a voice communication session. However, the communication session may be a chat communication session, a video communication session, a text communication session, an email communication session, a virtual reality communication session, and/or the like.

The above processes are described using the browser 102. However, the above descriptions are not limited to specifically to a browser 102. For example, a client application, such as a mobile application, a desktop application, a telephone application, and/or the like may be used in place the browser 102. The client application would provide similar functionality to the browser when communicating with the application framework 140/service gateway 130.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJS™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
    a microprocessor; and
    a non-transitory computer readable medium, coupled with the microprocessor and comprising microprocessor readable and executable instructions that program the microprocessor to execute:
        a service gateway that receives, from an application framework, a registration to be notified of an event managed by the service gateway, wherein the application framework is separated from a user communication endpoint and/or an external application by a network and wherein the event is based on a communication service provided by the service gateway; detects the event; sends a notification associated with the event to the application framework; receives, from the application framework, an object associated with the event, wherein the object associated with the event further comprises extension information that is not used by the communication service provided by the service gateway; and sends a message to the user communication endpoint and/or the external application that comprises the object.

2. The system of claim 1, wherein the service gateway receives, from the application framework, a query for a list of events managed by the service gateway, wherein the list of events are based on a plurality communication services provided by the service gateway and sends the list of events to the application framework.

3. The system of claim 1, wherein the event is associated with an application running on the communication endpoint and further comprising the application framework, wherein the application framework, based on the event, communicates with the user communication endpoint in a first communication session for the event and wherein other events for the application running on the communication endpoint are communicated in a second communication session to the communication endpoint via the service gateway.

4. The system of claim 1, wherein the event is a communication protocol event, wherein the service gateway sends the notification in response to the communication protocol event, wherein the message is a Hypertext Transfer Protocol (HTTP) message sent to the user communication endpoint by the service gateway, and wherein the object is a JavaScript Object Notation (JSON) object.

5. The system of claim 4, wherein the JSON object is used to create a custom service that is not supported by the service gateway.

6. The system of claim 4, wherein the service gateway converts a SIP communication session from a SIP device associated with the communication protocol event to a HTTP communication session with a browser in the user communication endpoint.

7. The system of claim 6, wherein the notification comprises the object and wherein the object comprises information associated with the event, wherein the event comprises a plurality of events for a plurality of communication services provided by the service gateway, wherein the notification comprises a plurality of objects that comprise information associated with the plurality of events, and wherein the message comprises a plurality of objects with a plurality of respective extension information.

8. The system of claim 1, wherein the application framework comprises a plurality of framework applications that registers with the service gateway to be notified of the event and wherein the notification associated with the event is sent based on a priority of the framework applications or on a first come-first-serve basis.

9. The system of claim 1, wherein the service gateway receives, from the application framework, a request to use the communication service provided by the service gateway and wherein the request to use the communication service is based on a request from the user communication endpoint sent directly to the application framework.

10. A method comprising:
    receiving, by a microprocessor, from an application framework, a registration to be notified of an event managed by a service gateway, wherein the application framework is separated from a user communication endpoint and/or an external application by a network and wherein the event is based on a communication service provided by the service gateway;

detecting, by the microprocessor, the event;

sending, by the microprocessor, a notification associated with the event to the application framework;

receiving, by the microprocessor, from the application framework, an object associated with the event, wherein the object associated with the event further comprises extension information that is not used by the communication service provided by the service gateway; and sending, by the microprocessor, a message to the user communication endpoint and/or the external application that comprises the object.

11. The method of claim 10, wherein the service gateway receives, from the application framework, a query for a list of events managed by the service gateway, wherein the list of events are based on a plurality communication services provided by the service gateway and further comprising sending the list of events to the application framework.

12. The method of claim 10, wherein the event is associated with an application running on the communication endpoint and further comprising, based on the event, communicating with the user communication endpoint in a first communication session, wherein other events for the application running on the communication endpoint are communicated in a second communication session to the communication endpoint via the service gateway.

13. The method of claim 10, wherein the event is a communication protocol event, wherein the service gateway sends the notification in response to the communication protocol event, wherein the message is a Hypertext Transfer Protocol (HTTP message sent to the user communication endpoint by the service gateway, and wherein the object is a JavaScript Object Notation (JSON) object.

14. The method of claim 13, wherein the JSON object is used to create a custom service that is not supported by the service gateway.

15. The method of claim 13, wherein the service gateway converts a SIP communication session from a SIP device associated with the communication protocol event to a HTTP communication session with a browser in the user communication endpoint.

16. The method of claim 15, wherein the notification comprises the object and wherein the object comprises information associated with the event, wherein the event comprises a plurality of events for a plurality of communication services provided by the service gateway, wherein the notification comprises a plurality of objects that comprise information associated with the plurality of events, and wherein the message comprises a plurality of objects with a plurality of respective extension information.

17. The method of claim 10, wherein the service gateway receives, from the application framework, a request to use the communication service provided by the service gateway and wherein the request to use the communication service is based on a request from the user communication endpoint sent directly to the application framework.

18. A method comprising:

sending, by a microprocessor executing an application framework, to a service gateway, a registration to be notified of an event managed by the service gateway, wherein the application framework is separated from a user communication endpoint and/or an external application by a network and wherein the event is based on a communication service provided by the service gateway;

receiving, by the microprocessor and from the service gateway, a notification associated with the event; and sending, by the microprocessor, to the service gateway, an object associated with the event, wherein the object associated with the event further comprises extension information that is not used by the communication service provided by the service gateway, and wherein the service gateway sends a message to the user communication endpoint and/or the external application that comprises the object.

19. The method of claim 18, wherein event is a communication protocol event, wherein the service gateway sends the notification in response to the communication protocol event, wherein the message is a Web Real-Time Communication (WebRTC) message sent to the user communication endpoint by the service gateway, and wherein the object is a JavaScript Object Notation (JSON) object.

20. The method of claim 18, wherein the event is associated with an application running on the communication endpoint and further comprising, based on the event, communicating with the user communication endpoint in a first communication session, wherein other events for the application running on the communication endpoint are communicated in a second communication session to the communication endpoint via the service gateway.

* * * * *